(12) United States Patent
Shah et al.

(10) Patent No.: US 11,943,107 B2
(45) Date of Patent: *Mar. 26, 2024

(54) CLOUD NODE ROUTING

(71) Applicant: Alkira, Inc., San Jose, CA (US)

(72) Inventors: Himanshu Shah, San Jose, CA (US); Atif Khan, San Jose, CA (US); Murtuza Attarwala, San Jose, CA (US)

(73) Assignee: ALKIRA, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,656

(22) Filed: Dec. 5, 2022

(65) Prior Publication Data

US 2023/0094339 A1 Mar. 30, 2023

Related U.S. Application Data

(63) Continuation of application No. 17/419,655, filed as application No. PCT/US2019/069174 on Dec. 31, 2019, now Pat. No. 11,546,213.

(60) Provisional application No. 62/787,238, filed on Dec. 31, 2018.

(51) Int. Cl.
*G06F 15/16* (2006.01)
*H04L 41/082* (2022.01)
*H04L 47/70* (2022.01)
*H04L 67/10* (2022.01)

(52) U.S. Cl.
CPC ............ *H04L 41/082* (2013.01); *H04L 47/82* (2013.01); *H04L 67/10* (2013.01)

(58) Field of Classification Search
CPC ............... H04L 41/0823; H04L 41/082; H04L 41/0826; H04L 47/82; H04L 67/10; H04L 43/0876
USPC ........................................................ 709/220
See application file for complete search history.

(56) References Cited

U.S. PATENT DOCUMENTS

| | | | | |
|---|---|---|---|---|
| 10,742,721 B1 * | 8/2020 | Wagner | ................... | H04L 67/10 |
| 2012/0271944 A1 | 10/2012 | Turner et al. | | |
| 2014/0075432 A1 | 3/2014 | McGrath et al. | | |
| 2014/0304398 A1 | 10/2014 | Carlen et al. | | |
| 2015/0146580 A1 * | 5/2015 | Olivier | ................ | H04L 65/1046 |
| | | | | 370/261 |
| 2016/0127254 A1 | 5/2016 | Kumar et al. | | |
| 2016/0344604 A1 * | 11/2016 | Raleigh | ............... | H04L 41/0893 |

(Continued)

OTHER PUBLICATIONS

International Application No. PCT/US2019/69174, International Search Report and Written Opinion dated Mar. 20, 2020.

(Continued)

*Primary Examiner* — Ruolei Zong
(74) *Attorney, Agent, or Firm* — Vani Moodley, Esq.

(57) ABSTRACT

A router architecture that facilitates cloud exchange point routing is disclosed. The architecture relies upon B-nodes to connect branch network to cloud, S-nodes to connect services, and V-nodes to connect cloud to cloud. The nodes can be essentially stateless with node configuration stored outside a router, which facilitates ripping and replacement of nodes. Multiple virtual private clouds can be implemented with respective pluralities of Kubernetes pods and a master Kubernetes cluster. Consumer premises equipment is coupled to a first virtual private cloud that forms a virtual extensible local area network with a second private cloud.

15 Claims, 12 Drawing Sheets

(56) References Cited

U.S. PATENT DOCUMENTS

| | | | | |
|---|---|---|---|---|
| 2016/0371127 A1* | 12/2016 | Antony | ............... | G06F 11/0793 |
| 2017/0171026 A1 | 6/2017 | Lucas et al. | | |
| 2017/0286516 A1* | 10/2017 | Horowitz | ............ | G06F 16/2365 |
| 2017/0310774 A1* | 10/2017 | Nano | .................... | H04L 67/535 |
| 2020/0067983 A1* | 2/2020 | Soryal | ................. | G06F 9/45558 |
| 2020/0162517 A1* | 5/2020 | Wong | .................... | H04W 12/12 |
| 2020/0162959 A1* | 5/2020 | Radlein | .................. | H04L 45/38 |

OTHER PUBLICATIONS

Maranville, et al., "reductus: a stateless Python data-reduction service with a browser frontend." Journal of Applied Crystallography. Apr. 23, 2018. https://arxiv.org/pdf/1804.1248.pdf.

* cited by examiner

US 11,943,107 B2

CLOUD NODE ROUTING

CROSS-REFERENCE TO RELATED APPLICATIONS

This application is a continuation of U.S. Non-Provisional Patent Application No. 17/419,655, entitled "CLOUD NODE ROUTING", and filed on Jun. 29, 2021, which is a national phase application pursuant to 35 U.S.C. § 371 of International Application No. PCT/US2019/069174 entitled, "CLOUD NODE ROUTING", and filed on Dec. 31, 2019, which claims priority to U.S. Provisional Patent Application No. 62/787,238, entitled "MULTI-TENANT ORCHESTRATOR FOR REMOTE SERVICES EXCHANGE", and filed on Dec. 31, 2018, the disclosures of which are hereby incorporated by reference herein.

DETAILED DESCRIPTION

Figure 1:
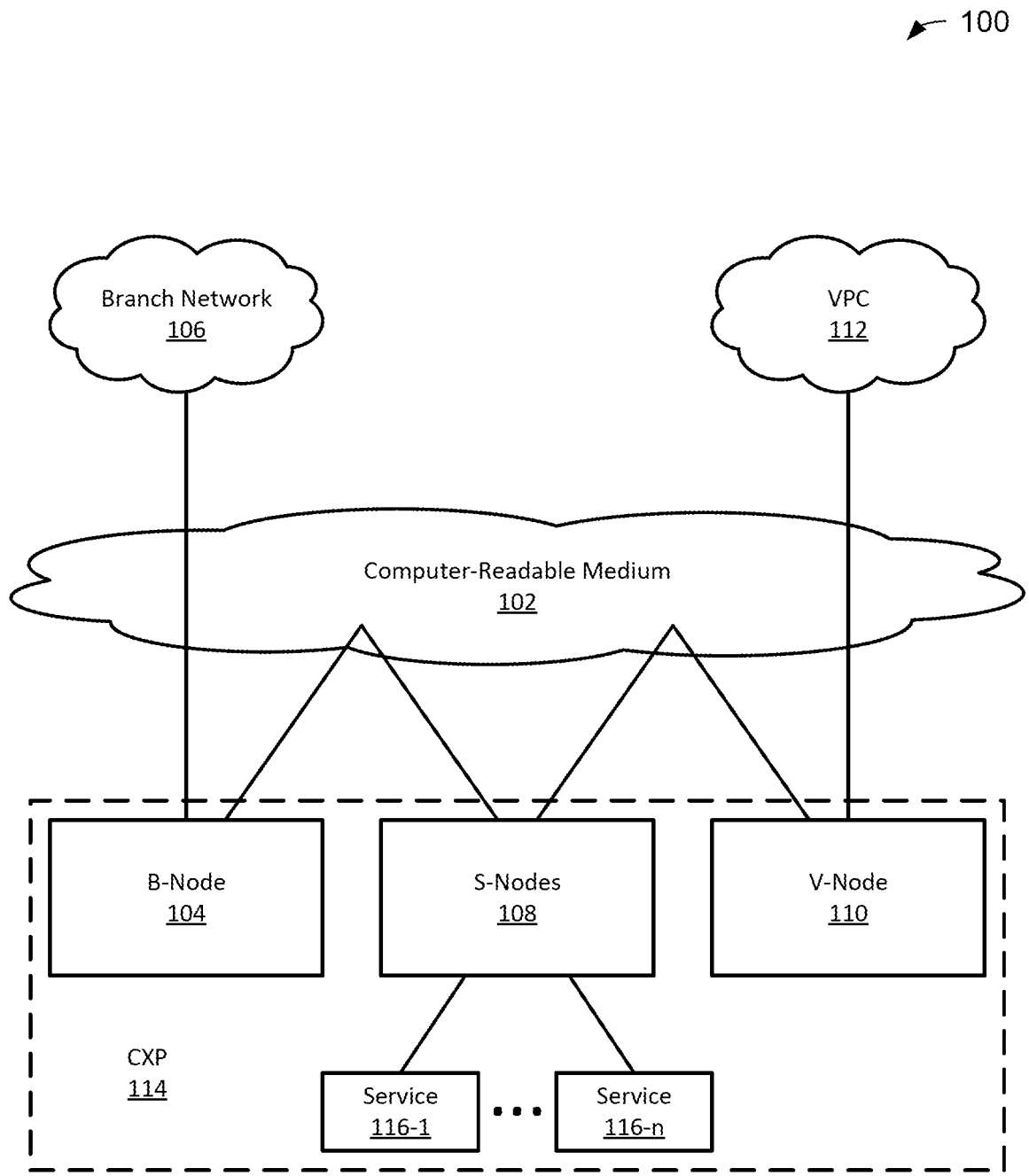
FIG. 1 is a diagram of an example of a system for multi-tenant orchestration.

FIG. 1 is a diagram 100 of an example of a system for multi-tenant orchestration. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, and a virtual private cloud (VPC) 112 coupled to the V-Node 110 through the CRM 102. In the diagram 100, a cloud services exchange platform (CXP) 114 includes the B-node 104, the S-nodes 108, the V-node 110, and a service engine 116-1 to a service engine 116-n (collectively, the services 116) coupled to the S-nodes 108.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), infrastructure as a service (IaaS), or platform as a service (PaaS) offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, IPsec, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, IPsec, etc.), (iii) monitor traffic, (iv) control traffic in accordance with one or more policies (e.g., security policies), etc.

Figure 2:
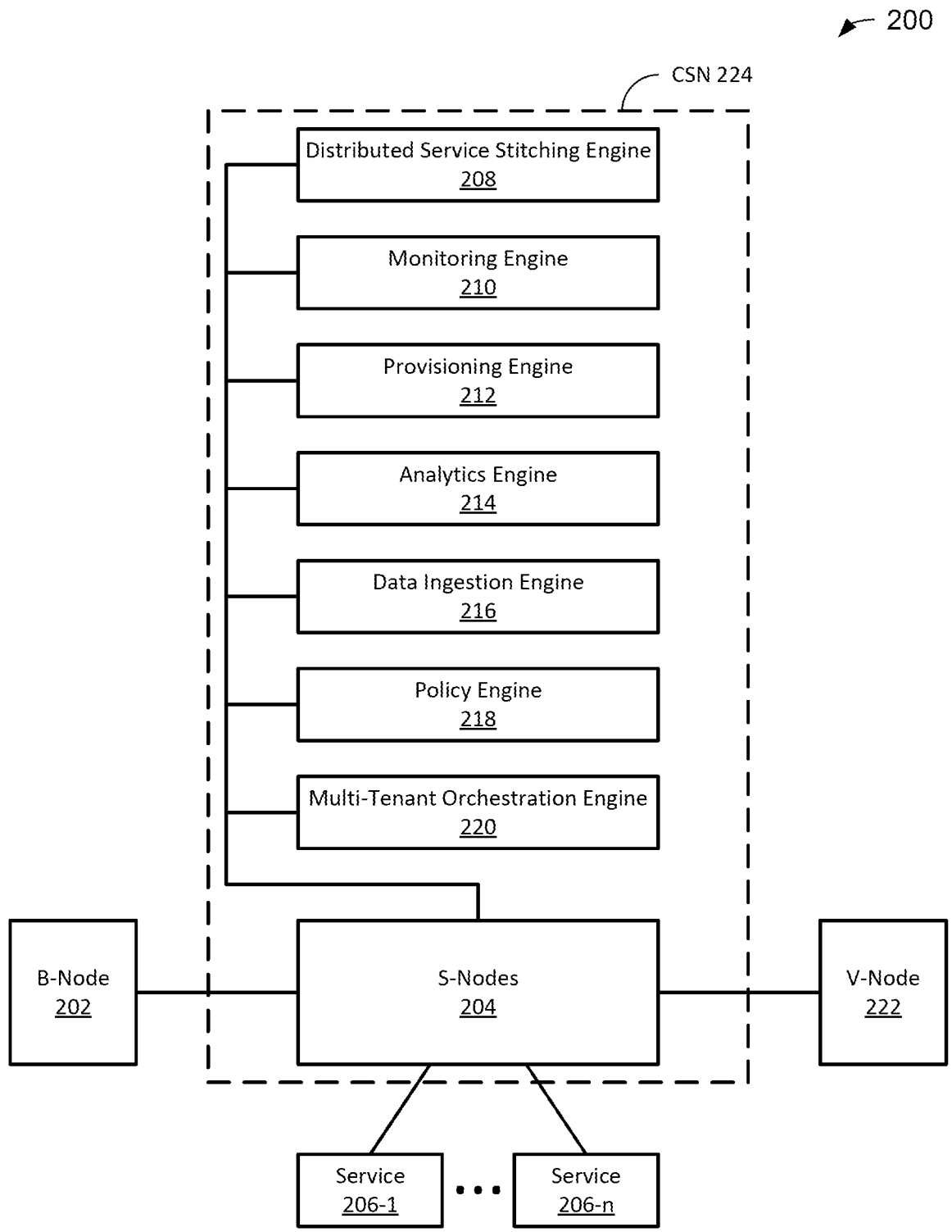
FIG. 2 is a diagram of an example of a cloud exchange point (CXP).

FIG. 2 is a diagram 200 of an example of a cloud exchange point (CXP). The diagram 200 includes a B-node 202, an S-node 204 coupled to the B-node 202, a service engine 206-1 to a service engine 206-*n* (collectively the services 206) coupled to the S-nodes 204, a distributed service stitching (DSS) engine 208 coupled to the S-nodes 204, a monitoring engine 210 coupled to the S-nodes 204, a provisioning engine 212 coupled to the S-nodes 204, an analytics engine 214 coupled to the S-nodes 204, a data ingestion engine 216 coupled to the S-nodes 204, a policy engine 218 coupled to the S-nodes 204, a multi-tenant orchestration (MTO) engine 220 coupled to the S-nodes 204, and a V-node 222 coupled to the S-nodes 204. The distributed service stitching engine 208, the monitoring engine 210, the provisioning engine 212, the analytics engine 214, the data ingestion engine 216, the policy engine 218, the multi-tenant orchestration engine 220, and the S-nodes 204 can be collectively referred to as a cloud services node (CSN) 224.

The B-node 202 is intended to represent a B-node like the B-node 104 described with reference to FIG. 1. The S-nodes 204 are intended to represent S-nodes like the S-nodes 108 described with reference to FIG. 1. The services 206 are intended to represent services like the services 116 described with reference to FIG. 1.

The DSS engine 208 is intended to represent an engine that stitches together (i.e. provide coherent communication, coordination, and connection to) S-nodes associated with a plurality of CXPs associated with a respective plurality of different regions. In a specific implementation, the DSS engine 208 is configured to enable services from other regions (other CXPs) to be properly hosted in a region with which the S-nodes 204 are associated in order to satisfy one or more restrictions or regulations of a service/application. The DSS engine 208 operates to establish a mesh network, a hub and spoke network, another applicable network distribution paradigm, or a combination of these.

The monitoring engine 210 is intended to represent an engine that inspects data packets passed to the S-nodes 204 and identifies attributes about individual packets or groups of packets (e.g., identify header information that may be used to identify a source, destination, or application/service relevant to such packet).

The provisioning engine 212 is intended to represent an engine that facilitates provisioning one or more of the services 206 responsive to a request therefor. In a specific implementation, the S-nodes 204 are configured to host the requested service itself, enabling the customer to access the service through its connection to the S-nodes 204, without having to establish connectivity with the service provider or having to be siloed to a service provider's platform.

The analytics engine 214 is intended to represent an engine that obtains data from data ingestion engine 216 (which is configured to receive data from network elements and/or end-points, and collect telemetry) and provide data analytics corresponding to (i) traffic coming into the S-nodes 204, (i) corresponding services being used in connection with the S-nodes 204 throughout a connected network, (iii) connectivity issues within a network, and the like.

The policy engine 218 is intended to represent an engine to apply a policy at the S-nodes 206. In a specific implementation, the policy is identifiable from a user request for the policy to be applied to a given flow of traffic. In a specific implementation, the policy can be applied without requiring the customer to instantiate a service that applies the policy.

The MTO engine 220 is intended to represent an engine that, upon selection, automatically instantiates one or more of the services 206 (which may be available across a series of CSNs) to multiple tenants without requiring manual instantiation by such tenants. In a specific implementation, the MTO engine 220 is SaaS-based. In some instances, orchestration features provided by the MTO engine 220 may be provided as a wrapper around a third-party service (e.g., where the MTO engine 220 is integrated directly within a third-party service, in a transparent or apparent manner). In such instances, only the features of a particular service that are supported by the CSN 224 may be shown. In other instances, the orchestration provided by the MTO engine 220 may be offered as a distinct SaaS in addition to other third-party services.

The V-node 222 is intended to represent a V-node like the V-node 110 described with reference to FIG. 1.

The CSN 224 is intended to represent a collection of engines associated with the S-nodes 204. In an alternative, the CSN 224 is incorporated into one or more S-nodes. In yet another alternative, the services 206 are incorporated into the CSN 224 (or one or more S-nodes).

Figure 3:
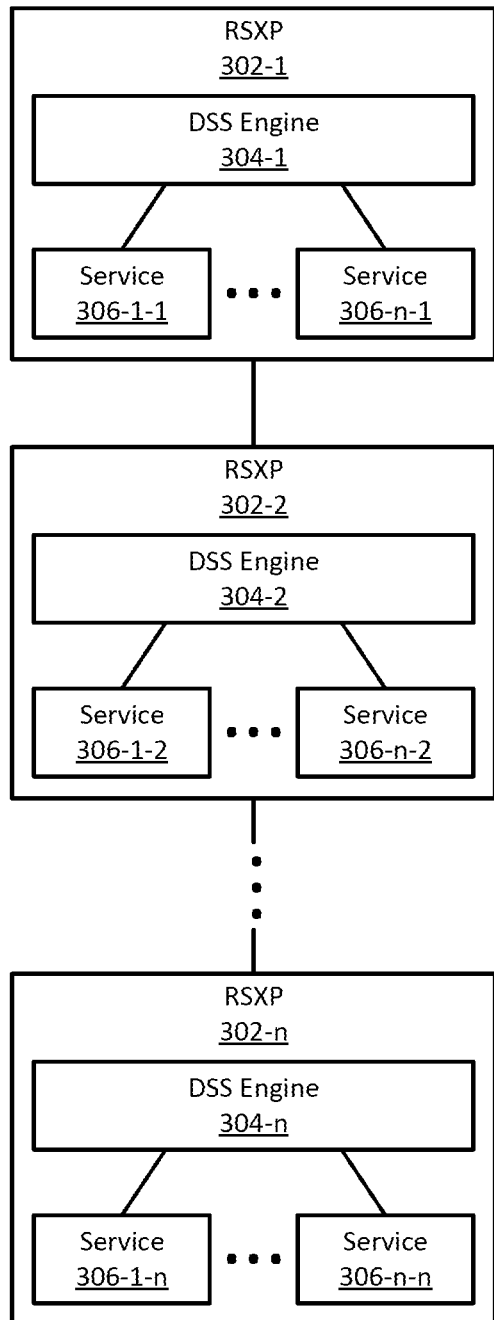
FIG. 3 is a diagram of an example of a plurality of regional services exchange points (RSXP) stitched together to form a network.

FIG. 3 is a diagram 300 of an example of a plurality of regional services exchange points (RSXP) stitched together to form a network. The diagram 300 includes an RSXP 302-1 to an RSXP 302-$n$ (collectively, the RSXPs 302). The RSXP 302-1 includes a DSS engine 304-1, the RSXP 302-2 includes a DSS engine 304-2, and the RSXP 302-$n$ includes a DSS engine 304-$n$. The DSS engines 304-1 to 304-$n$ can collectively be referred to as DSS engines 304. The RSXP 302-1 includes a service 306-1-1 to a service 306-$n$-1 (collectively, the services 306-1), the RSXP 302-2 includes a service 306-1-2 to a service 306-$n$-2 (collectively, the services 306-2), and the RSXP 302-$n$ includes a service 306-1-$n$ to a service 306-$n$-$n$ (collectively, the services 306-$n$). The services 306-1 to 306-$n$ can collectively be referred to as services 306. It may be noted that the services 306 are depicted as coupled to the DSS engines 304 for conceptual purposes, but it should be understood the services could be coupled to S-nodes as depicted in FIG. 2.

The RSXPs 302 are intended to represent engines, at least including the DSS engines 304, associated with different geographic, geopolitical, national, or other regions. The DSS engines 304 act as single engine with respect to each of the services 306 regardless of the region in which the services 306 are found.

Figure 4:
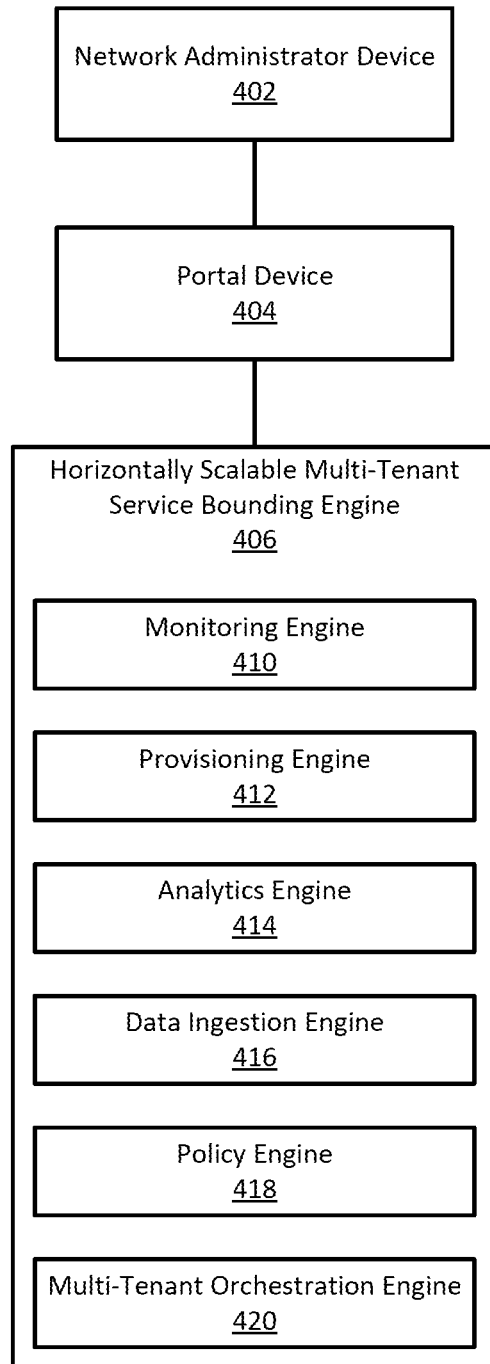
FIG. 4 is a diagram of an example of a horizontally scalable multi-tenant service bounding engine.

FIG. 4 is a diagram 400 of an example of a horizontally scalable multi-tenant service bounding engine. The diagram 400 includes a network administrator device 402, a portal device 404, and a horizontally scalable multi-tenant service bounding engine 406. The horizontally scalable multi-tenant service bounding engine 406 includes a monitoring engine 410, a provisioning engine 412, an analytics engine 414, a data ingestion engine 416, a policy engine 418, and a multi-tenant orchestration engine 420, which are similar in function to the monitoring engine 210, the provisioning engine 212, the analytics engine 214, the data ingestion engine 216, the policy engine 218, and the multi-tenant orchestration engine 220 of FIG. 2.

The network administrator device 402 is intended to represent an end user device utilized by a network administrator of a customer, or a human or artificial agent thereof. In a specific implementation, the network administrator device 402 is a smartphone, tablet device, laptop, or other personal computing device of a network administrator, or a human or artificial agent thereof.

The portal device 404 is intended to represent a network device through which a network administrator, or agent thereof, can utilize the network administrator device 402 to access the horizontally scalable multi-tenant service bounding engine 406. In a specific implementation, the network administrator, or agent thereof, accesses features and functionality of the horizontally scalable multi-tenant service bounding engine 406 via the portal device 404, through which they may make selections.

The horizontally scalable multi-tenant service bounding engine 406 may be implemented within a CXP, such as the CXP 114 or FIG. 1, an S-node, such as one or more of the S-nodes 108 of FIG. 1 or the S-nodes 204 of FIG. 2, or a CSN, such as the CSN 224 of FIG. 2. Advantageously, and as the name suggests, the horizontally scalable multi-tenant service bounding engine 406 facilitates horizontal scaling for multi-tenant service.

Figure 5:
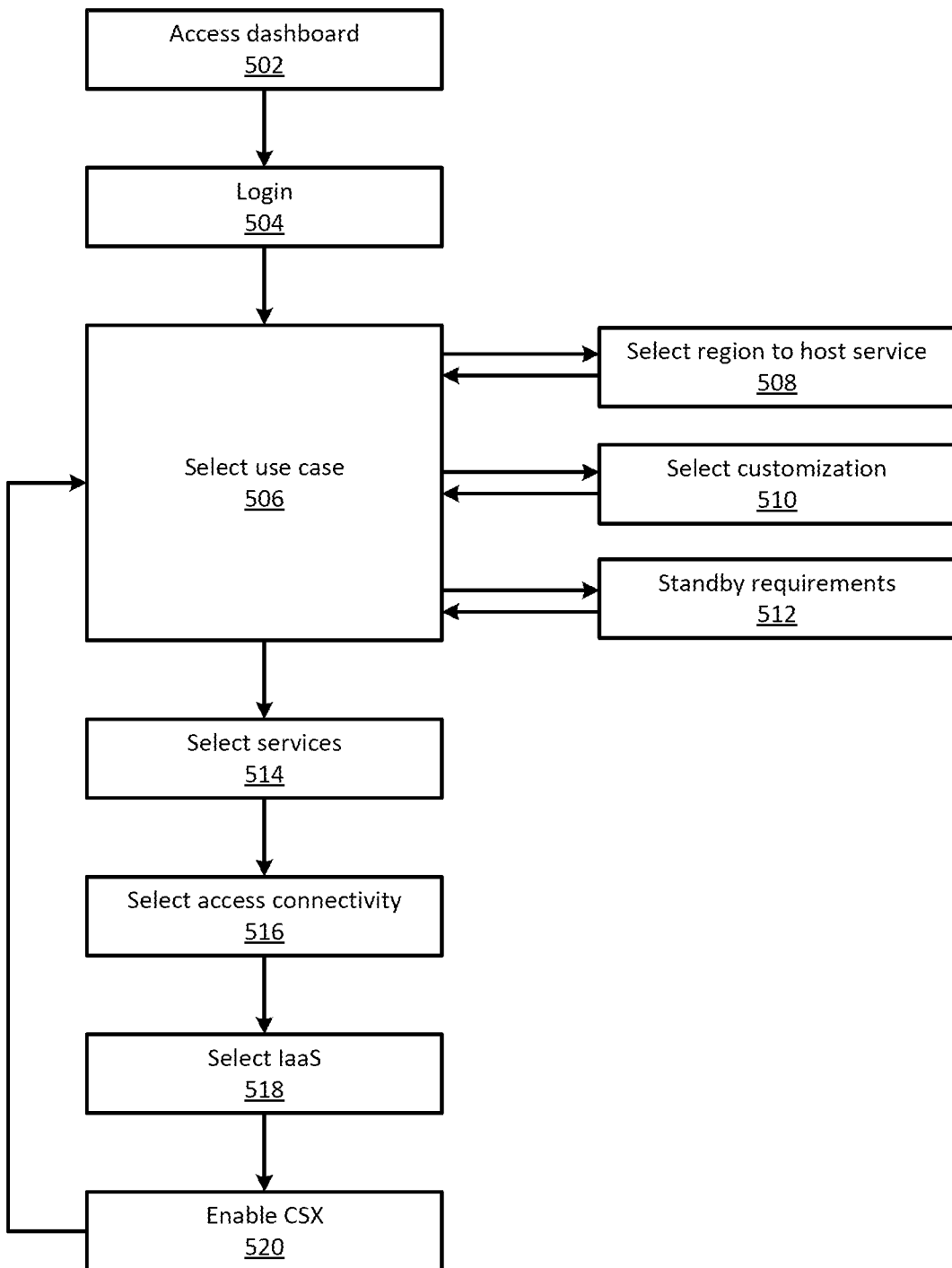
FIG. 5 is a flowchart of an example of network administrator access to an RSXP.

FIG. 5 is a flowchart 500 of an example of network administrator access to an RSXP. The flowchart 500 and other flowcharts described in this paper include modules that can be reordered or rearranged for parallel execution, if applicable. The flowchart 500 starts at module 502 with accessing a dashboard made available via a portal of a CXP, such as the CXP 114 of FIG. 1.

The flowchart 500 continues to module 504 with logging into the portal using customer specific credentials. The flowchart 500 continues to module 506 with selecting a use case for a deployment (e.g., on-premises provisioning of IaaS, on-premises provisioning of SaaS, remote user, enterprise apps/services, IaaS to IaaS, hosted DM2, or the like). The flowchart 500 continues to module 508 with selecting a first use case, which is selecting a region within which to host a service, then the flowchart 500 returns to module 506 and continues as described. The flowchart 500 continues to module 510 with selecting a second use case, which is selecting custom requirements (e.g., customer already has a deal/license with a third party for a given service, customer has a proprietary service of their own, customer desires cloud native services or services offered by a public cloud provider, pay as you go details, etc.), then the flowchart 500 returns to module 506 and continues as described. The flowchart 500 continues to module 512 with selecting a third use case, which is selecting standby requirements (e.g., ready standby, cold standby, etc.), then the flowchart 500 returns to module 506 and continues as described.

The flowchart 500 continues to module 514 with selecting a fourth use case, which is selecting services. The flowchart 500 continues to module 516 with selecting access connectivity (e.g., MLPS, IPsec, via Data Center, etc.). With regard to connectivity, for SaaS, it is desirable for the CSN to know a customer's origin because it may impact service levels, pricing, etc. The flowchart 500 continues to module 518 with selecting an IaaS. Similar to SaaS, for IaaS it is desirable for the CSN to know where the workloads will be located because it may impact service levels, pricing, etc. The flowchart 500 continues to module 520 with enabling a CSX.

In connection with the foregoing, a CXP, such as the CXP 114 of FIG. 1, may provide suggestions to a customer based on analytics of data from the customer's prior use, or the use of prior customers that may be similarly situated to the given customer. In some embodiments, a CXP may generate a profile for a given customer based on such details, and provide suggestions (e.g., suggested services) to the customer on that basis. In some embodiments, a CXP may implement a pricing model for a given customer that is provided on a per-workload basis. In some instances, a CXP may facilitate a selection of where to provision a given workload based on most cost-effective options.

In some embodiments, a CXP may be deployed as a blockchain network, where audit logs may be transparent such that each change can be traced back to the admin who changed it. With other blockchain features that may be provided by the technology of the present disclosure, any topology changes, rule changes, or network changes may be traced. Similarly, rules may require consensus among a certain number of administrators before such a change takes effect. A footprint or signature of the network topology may be leveraged to generate a hash in such deployments.

Figure 6A:
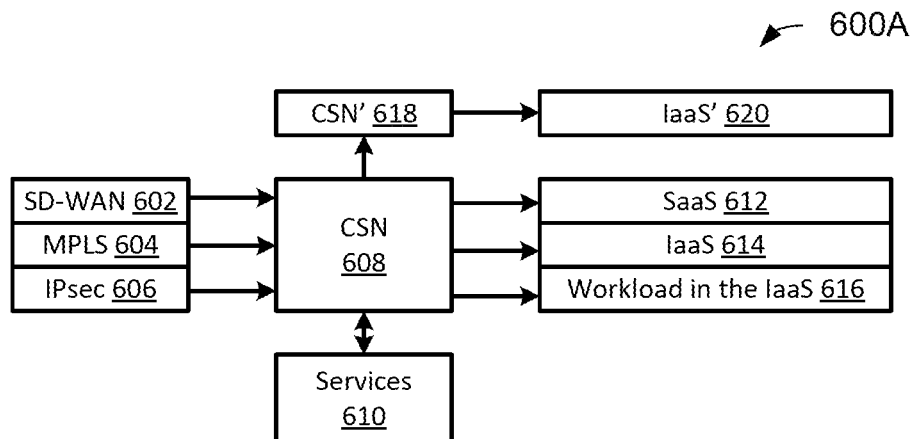
FIGS. 6A-6C depict various architectures and illustrate a range of deployment options.
Figure 6B:
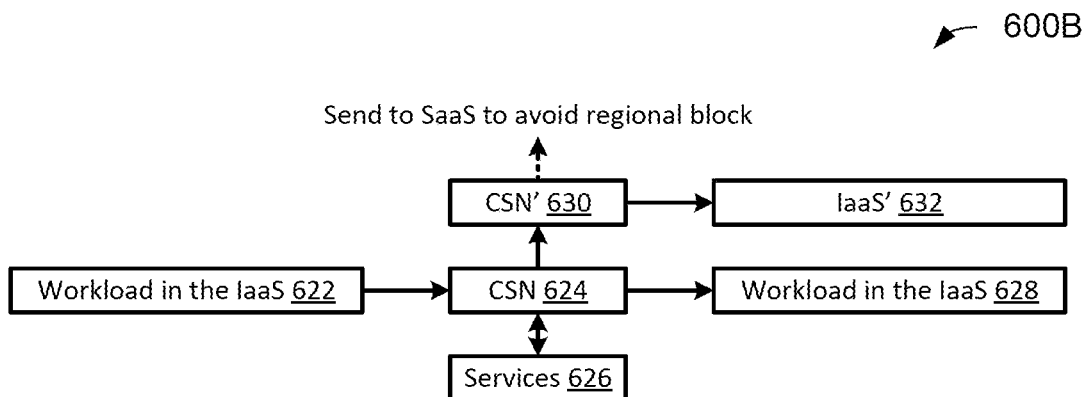
Figure 6C:
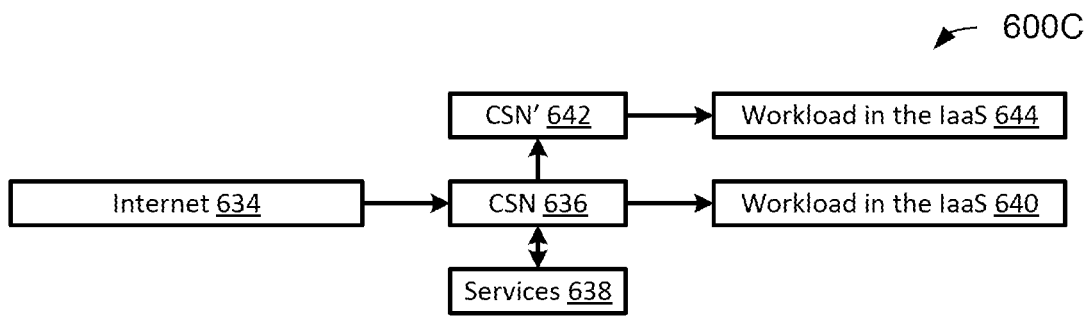

FIGS. 6A-6C depict various architectures and illustrate a range of deployment options. FIG. 6A depicts a diagram 600A that covers on-premises to and from IaaS, on-premises to and from SaaS, and remote users. FIG. 6B depicts a diagram 600B that covers IaaS to IaaS. FIG. 6C depicts a diagram 600C that covers end users outside of an enterprise.

The diagram 600A includes an SD-WAN component 602, a multiprotocol label switching (MPLS) component 604, an IPsec component 606, a CSN 608 coupled to the SD-WAN component 602, the MPLS component 604, and the IPsec component 606, services 610 coupled to the CSN 608, a SaaS platform 612 coupled to the CSN 608, an IaaS platform 614 coupled to the CSN 608, a workload in the IaaS engine 616 coupled to the CSN 608, a CSN' 618 coupled to the CSN 608, and an IaaS' 620 coupled to the CSN' 618. The diagram 600A illustrates a flow from the SD-WAN component 602, the MPLS component 604, and the IPsec component 606 to the CSN 608 and from the CSN 608 to the SaaS platform 612, the IaaS platform 614, and the workload in the IaaS engine 616 in the form of arrows. The CSN 608 interacts with the services 610 (represented with double arrows) and the flow also passes from the CSN 608 to the CSN' 618 and then to the IaaS' 620. In a specific implementation, the CSN' 618 has no associated services. In an alternative, the CSN 608 does not have the services 610, is coupled to another CSN", or both. In an alternative, IPsec component 606 is replaced with a proprietary secure network protocol suite, an alternative security suite, or a combination of these.

The diagram 600B includes a workload in the IaaS engine 622, a CSN 624 coupled to the workload in the IaaS engine 622, services 626 coupled to the CSN 624, a workload in the IaaS engine 628 coupled to the CSN 624, a CSN' 630 coupled to the CSN 624, and an IaaS' 632 coupled to the CSN'. The diagram 600B illustrates a flow from the workload in the IaaS engine 622 to the CSN 624 and from the CSN 624 to the workload in the IaaS engine 628 in the form of arrows. The CSN 624 interacts with the services 626 (represented with double arrows) and the flow also passes from the CSN 624 to the CSN' 630 and then to the IaaS' 632. Optionally, the CSN' 630 can send to a SaaS (not shown) to avoid a regional block, which is represented by a dashed arrow from the CSN' 630. In a specific implementation, the workload in the SaaS engine 622 can enforce policy on packets it cannot see.

The diagram 600C includes Internet 634, a CSN 636 coupled to the Internet 634, services 638 coupled to the CSN 636, a workload in the IaaS engine 640 coupled to the CSN 636, a CSN' 642 coupled to the CSN 636, and a workload in the IaaS engine 644 coupled to the CSN' 642. The diagram 600C illustrates a flow from the Internet 634 to the CSN 636 and from the CSN 636 to the workload in the IaaS engine 640 in the form of arrows. The CSN 636 interacts with the services 638 (represented with double arrows) and the flow also passes from the CSN 636 to the CSN' 642 and then to the workload in the IaaS engine 644. In a specific implementation, the CSN' 642 and workload in the IaaS engine 644 are optional and in an alternative the CSN' 642 and workload in the IaaS engine 644 are absent.

Figure 7:
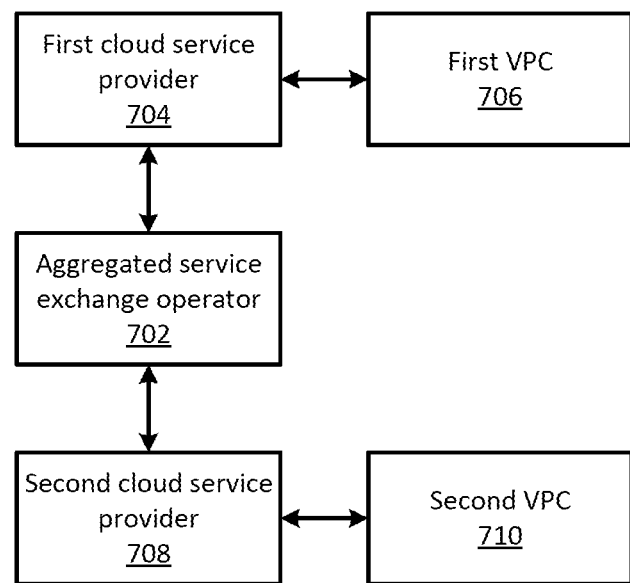
FIG. 7 is a diagram of an example of an aggregated cloud services provisioning system.

FIG. 7 is a diagram 700 of an example of an aggregated cloud services provisioning system. The diagram 700 includes an aggregated service exchange operator (ASEO) engine 702, a first cloud service provider 704 coupled to the ASEO engine 702, a first VPC 706 coupled to the first cloud service provider 704, a second cloud service provider 708 coupled to the ASEO engine 702, and a second VPC 710 coupled to the second cloud service provider 708. The ASEO engine 702 aggregates services provided via the first cloud service provider 704 and the second cloud service provider 708 and makes the first VPC 706 and the second VPC 710 available through a common platform to a common customer base. In a specific implementation, the ASEO operator engine 702 is coupled to more than two cloud service providers (not shown).

Figure 8:
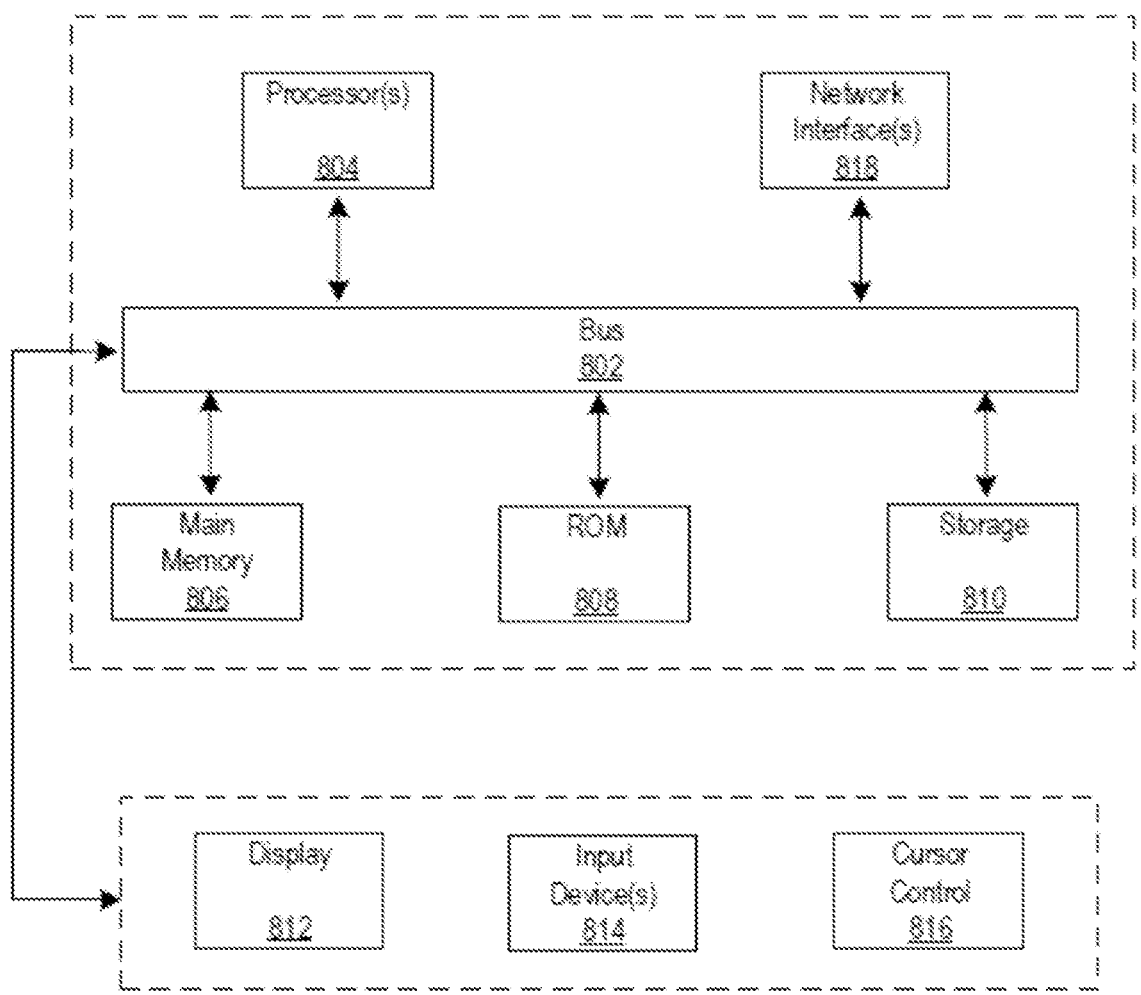
FIG. 8 is a diagram of an example computer system.

FIG. 8 is a diagram 800 of an example of a computer system. The diagram 800 includes a bus 802 or other communication mechanism for communicating information, one or more hardware processors ("the processor") 804 coupled with the bus 802 for processing information, and a main memory ("the memory") 806 coupled to the bus 802 for storing information and instructions to be executed by the processor 804. The memory 806 also may be used for storing temporary variables or other intermediate information during execution of instructions to be executed by the processor 804. Such instructions, when stored in storage media accessible to the processor 804, render the computer system into a special-purpose machine configured to perform the operations specified in the instructions. Such instructions may be read into the memory 806 from another storage medium, such as the storage device 810. Execution of the sequences of instructions contained in the memory 806 causes the processor 804 to perform process steps, such as those described in this paper, to act as a specially purposed machine.

The diagram 800 further includes, coupled to the bus 802, a read only memory (ROM) 808 or other static storage device—such as a magnetic disk, optical disk, or USB thumb drive (Flash drive), to name three—for storing static information and instructions for the processor 804, a display 812—such as a liquid crystal display (LCD) (or touch screen)—for displaying information to a computer user, an input device 814—such as a keyboard including alphanumeric and other keys—for communicating information and command selections to the processor 804, and a cursor control device 816—such as a mouse, a trackball, cursor direction keys, or other type of input device—for communicating direction information and command selections to the processor 804 and for controlling cursor movement on the display 812. Instead or in addition, the same direction information and command selections as cursor control may be implemented via receiving touches on a touch screen (e.g., of the display 812 or some other device with a screen).

A computing system may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component" can refer to logic embodied in hardware or firmware, or to a collection of software instructions, possibly having entry and exit points, written in a programming language, such as, for example, Java, C or C++. An engine as used in this paper, however, always includes hardware or firmware; the term "engine," as used in this paper, is not intended to represent a "software engine." A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as the storage device 810. Volatile media includes dynamic memory, such as the memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus 802. Transmission media can also take the form of acoustic or light waves, such as those generated during radio-wave and infra-red data communications.

The diagram 800 also includes one or more network interfaces ("the communication interface") 818 coupled to the bus 802. The communication interface 818 provides a two-way data communication coupling to one or more network links that are connected to one or more local networks. For example, the communication interface 818 may be an integrated services digital network (ISDN) card, cable modem, satellite modem, or a modem to provide a data communication connection to a corresponding type of telephone line. As another example, the communication interface 818 may be a local area network (LAN) card to provide a data communication connection to a compatible LAN (or WAN component to communicated with a WAN). Wireless links may also be implemented. In such an implementation, the communication interface 818 sends and receives electrical, electromagnetic or optical signals that carry data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through the communication interface 818, which carry the digital data to and from the computer system, are example forms of transmission media.

In operation, the computer system can send messages and receive data, including program code, through the network(s), network link, and communication interface 818. In the Internet example, a server might transmit a requested code for an application program through the Internet, the ISP, the local network and the communication interface 818. The received code may be executed by processor 804 as it is received, and/or stored in storage device 810, or other non-volatile storage for later execution or playback.

Each of the processes, methods, and algorithms described in this paper may be embodied in, and fully or partially automated by, code components executed by one or more computer systems or computer processors comprising computer hardware. The one or more computer systems or computer processors may also operate to support performance of the relevant operations in a "cloud computing" environment or as a SaaS. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Figure 9:
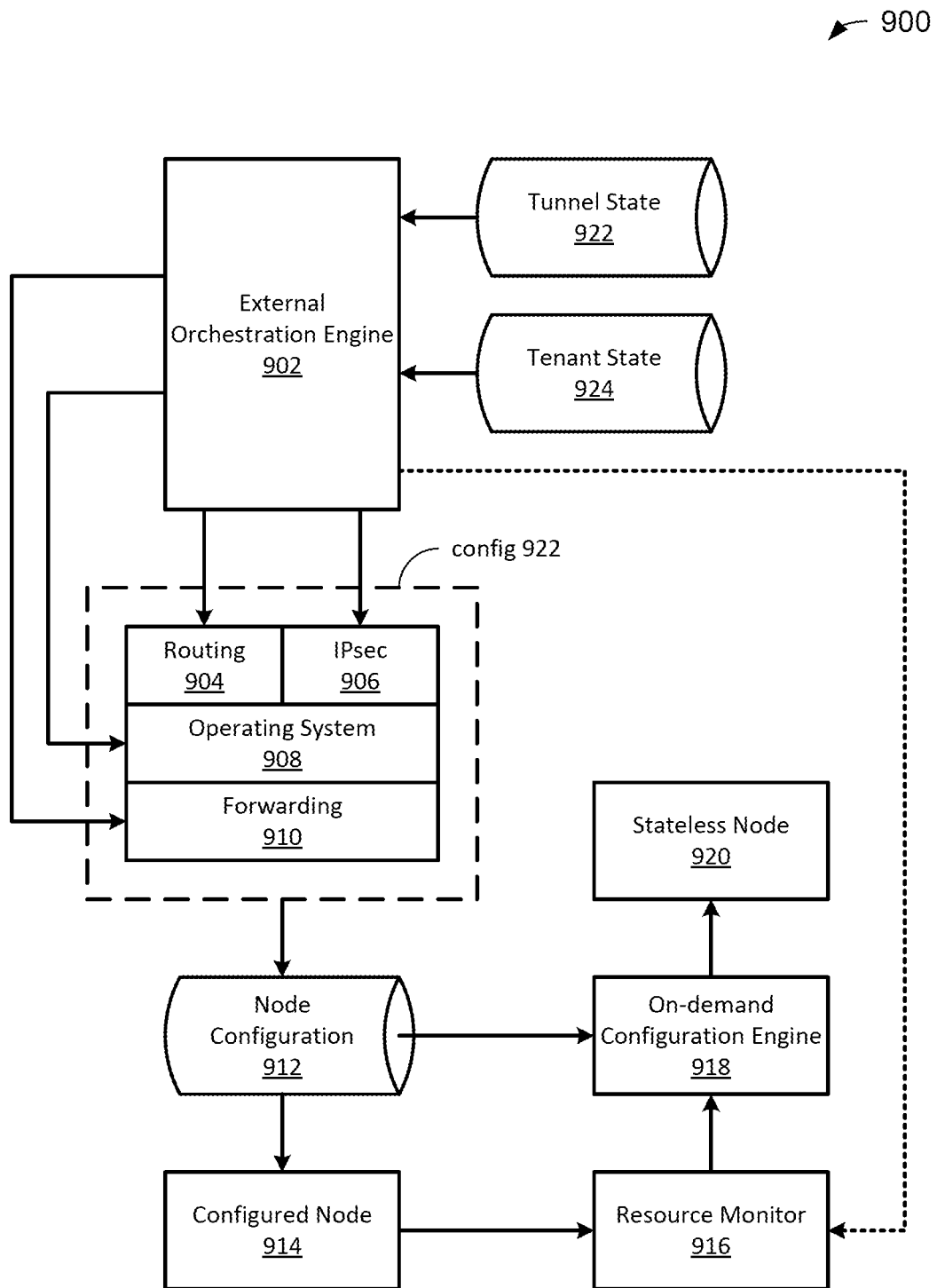
FIG. 9 is a diagram of an example of a CXP node configuration system.

FIG. 9 is a diagram 900 of an example of a CXP node configuration system. The diagram 900 includes an external orchestration engine 902, a routing component 904 coupled to the external orchestration engine 902, an IPsec component 906 coupled to the external orchestration engine 902, an operating system (OS) component 908 coupled to the external orchestration engine 902, and a forwarding component 910 coupled to the external orchestration engine 902. The routing component 904, the IPsec component 906, the OS component 908, and the forwarding component 910 can be collectively referred to as a configuration data structure 922.

The diagram 900 further includes a node configuration datastore 912 coupled to the configuration data structure 922, which represents a communication medium from the external orchestration engine 902 over which the configuration data structure is provided for storage in the node configuration datastore 912, a configured node 914 coupled to the node configuration datastore 914, a resource monitor 916 coupled to the configured node 914, an on-demand configuration engine 918 coupled to the resource monitor 916 and the node configuration datastore 912, a stateless node 920 coupled to the on-demand configuration engine 918, a tunnel state datastore 922 coupled to the external orchestration engine 902, and a tenant state datastore 924 coupled to the external orchestration engine 902.

The external orchestration engine 902 is intended to represent an engine that knows tunnel state (represented by the tunnel state datastore 922), which tenant is on which node (represented by the tenant state datastore 924), and how to configure nodes. The term "external" in this context is intended to mean node-external or router-external, as in the external orchestration engine 902 is implemented outside of a router. In a specific implementation, node configuration is performed outside of nodes of a CXP, such as nodes of the CXP 114 of FIG. 1. Advantageously, a node of a CXP can be ripped and replaced due to node configuration being stored outside of the node to be replaced. It may be noted that, with this implementation, it is not necessary for redundant nodes to synch with each other, which is beneficial because redundant nodes have a cost (e.g., synch modules); node-to-node synch communication is at least ameliorated and at best eliminated using the techniques described in this paper.

The routing component 904 is intended to represent a software component implemented on a configured node, such as the configured node 914. Routing forms virtual routing and forwarding (VRF) context for a tenant.

The IPsec component 906 is intended to represent a software component implemented on a configured node, such as the configured node 914. IPsec is a secure network protocol suite that authenticates and encrypts the packets of data to provide secure encrypted communication between two computers over an Internet Protocol network. IPsec includes protocols for establishing mutual authentication between agents at the beginning of a session and negotiation of cryptographic keys to use during the session. In a specific implementation, the IPsec component 906 is compliant with strongSwan, a multiplatform IPsec implementation.

The OS component 908 is intended to represent a software component implemented on a configured node, such as the configured node 914. In a specific implementation, the OS component 908 is compliant with Linux.

The forwarding component 910 is intended to represent a software component implemented on a configured node, such as the configured node 914. Forwarding includes flow management enabling flow-based routing. In a specific implementation, the forwarding component 910 is compliant with vector packet processing (VPP), a software algorithm that is used to quickly process network packets.

The node configuration datastore 912 is intended to represent a datastore of configuration parameters for a node. In a specific implementation, the node configuration datastore is an etcd datastore. etcd is a strongly consistent, distributed key-value store that provides a reliable way to store data that needs to be accessed by a distributed system or cluster of machines. In a specific implementation, the provisioning of nodes is accomplished using an entity relationship diagram (ERD) tool.

The configured node 914 is intended to represent a B-node, such as the B-node 104 of FIG. 1, an S-node, such as one of the S-nodes 108 of FIG. 1, or a V-node, such as the V-node 110 of FIG. 1. In a specific implementation, within the configured node 914 are configuration parameters such as represented in the diagram 900 as config data structure 922 (i.e., the routing component 904, the IPsec component 906, the OS component 908, and the forwarding component 910). Although the configured node 914 is coupled to the node configuration datastore 912 and, at least by implication, received configuration parameter values from the node configuration datastore 912, it should be understood that, instead or in addition, the configured node 914 could be pre-configured (i.e., at least partially configured prior to being coupled to the node configuration datastore 912).

The resource monitor 916 is intended to represent an engine that sends a trigger to the on-demand configuration engine 918 responsive to a stimulus from the configured node 914. Instead or in addition, the stimulus could come from some other source, such as the external orchestration engine 902, which is represented in the diagram 900 as a dotted arrow from the external orchestration engine 902 to the resource monitor 916. The stimulus is indicative of a need to spin up additional nodes to handle network resource consumption.

The on-demand configuration engine 918 is intended to represent an engine that provides node configuration parameter values to the stateless node 920 in response to a trigger from the resource monitor. In a specific implementation, the trigger is an indication that additional nodes are needed to handle network resource consumption. If network resource consumption decreases, the stimulus from the configured node 914 to the resource monitor 916 could also trigger the on-demand configuration engine 918 to tear down nodes (not shown).

The stateless node 920 is intended to represent a node that is not initially employed to handle network resource demands (e.g., traffic). Upon obtaining configuration parameter values from the node configuration datastore 912 via the on-demand configuration engine 918, where the configured node 914 is a first configured node, the stateless node 920 becomes a second configured node. In an alternative, the stateless node 920 could initially be handling network resource demands but its configuration is changed by the on-demand configuration engine 918 upon receipt of a trigger at the on-demand configuration engine 918 from the resource monitor 916.

Figure 10:
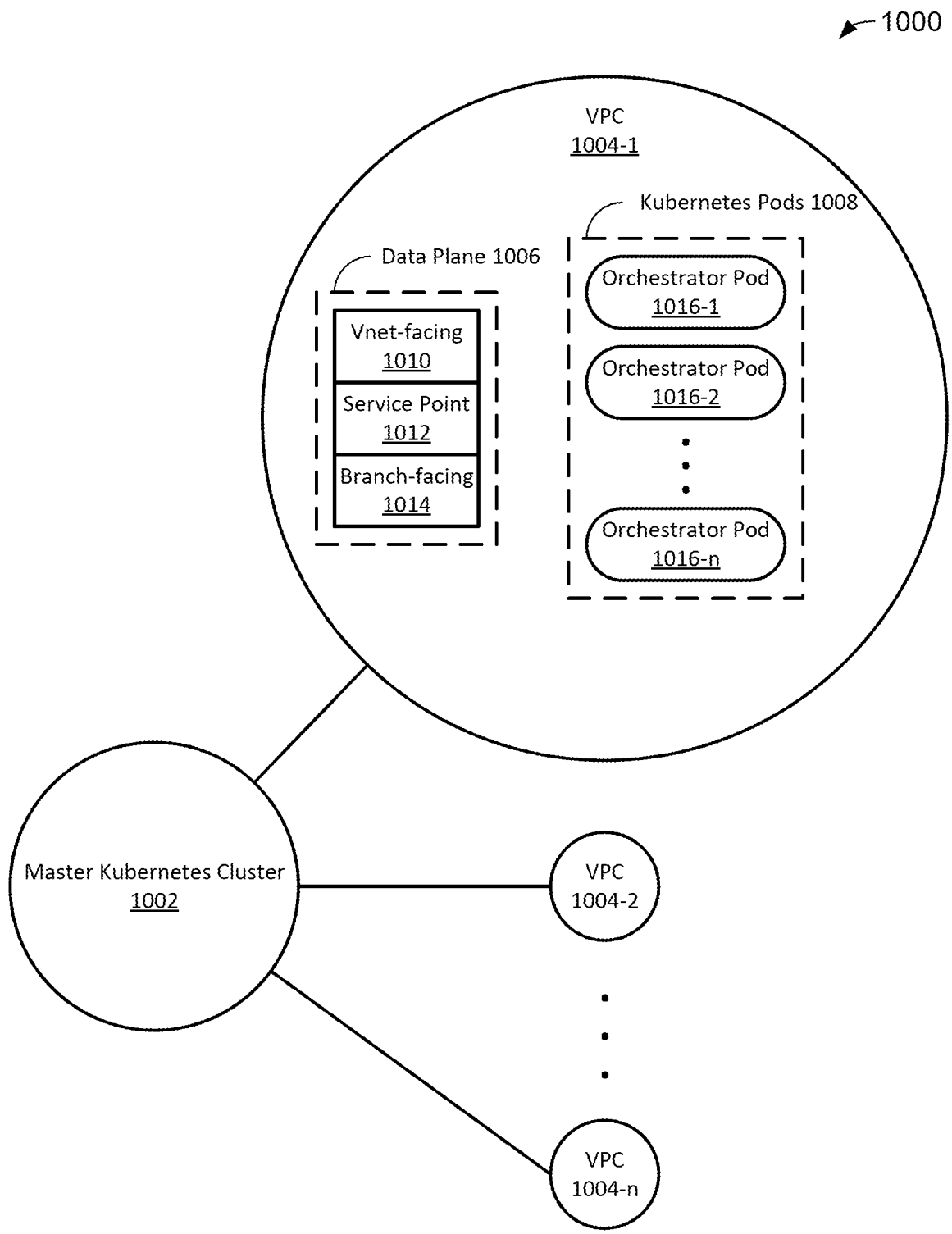
FIG. 10 is a diagram of an example of a system of VPCs with a master Kubernetes cluster.

FIG. 10 is a diagram 1000 of an example of a system of VPCs with a master Kubernetes cluster. The diagram 1000 includes a master Kubernetes cluster 1002 and a VPC 1004-1 to a VPC 1004-n (collectively the VPCs 1004). The VPC 1004-1 includes a data plane 1006 and Kubernetes pods 1008. The data plane 1006 includes a Vnet facing datastore 1010, a service point datastore 1012, and a branch-facing datastore 1014, which correspond to data associated with a V-node, S-node, and B-node respectively. The Kubernetes pods 1008 include an orchestrator pod 1016-1 to an orchestrator pod 1016-n (collectively the orchestrator pods 1016). The orchestrator pods 1016, potentially including engines from the master Kubernetes cluster 1002, are components of an orchestration engine, such as the external orchestration engine 902 of FIG. 9. The VPCs 1004-2 to 1004-n have a data plane and Kubernetes pods, as well (not shown).

Figure 11:
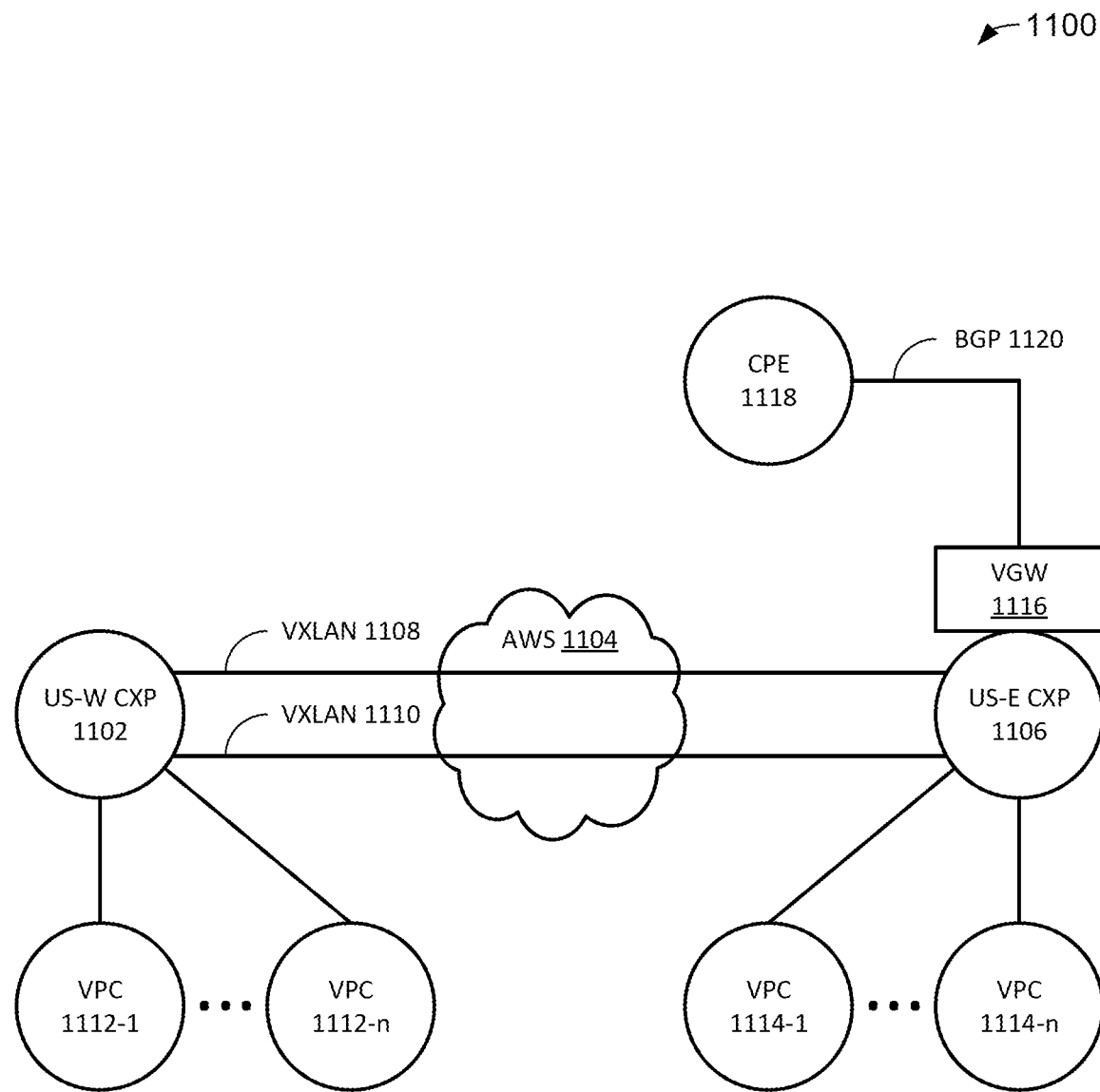
FIG. 11 is a diagram of an example of a system with regional CXPs.

FIG. 11 is a diagram 1100 of an example of a system with regional CXPs. The diagram 1100 includes a United States-West (US-W) CXP 1102, an Amazon Web Services (AWS) network 1104, and a United States-East (US-E) CXP 1106 coupled to the US-W CXP 1102 via the AWS network 1104. Specifically, the US-W CXP 1102 and the US-E CXP 1106 are coupled together via at least VXLAN 1108 and VXLAN 1110. The names US-W and US-E are chosen merely for illustrative purposes. Instead of or in addition to the AWS network 104, some other cloud network could be used to couple the US-W CXP 1102 and the US-E CXP 1106. The diagram 1100 further includes a VPC 1112-1 to a VPC 1112-n (collectively, the VPCs 1112) coupled to the US-W CXP 1102 and a VPC 1114-1 to a VPC 1114-n (collectively, the VPCs 1114) coupled to the US-E CXP. The diagram 1100 further includes a virtual gateway (VGW) device 1116 at the US-E CXP 1106 and customer premises equipment (CPE) 1118 coupled to the VGW device 1116 via border gateway protocol (BGP) 1120.

Figure 12:
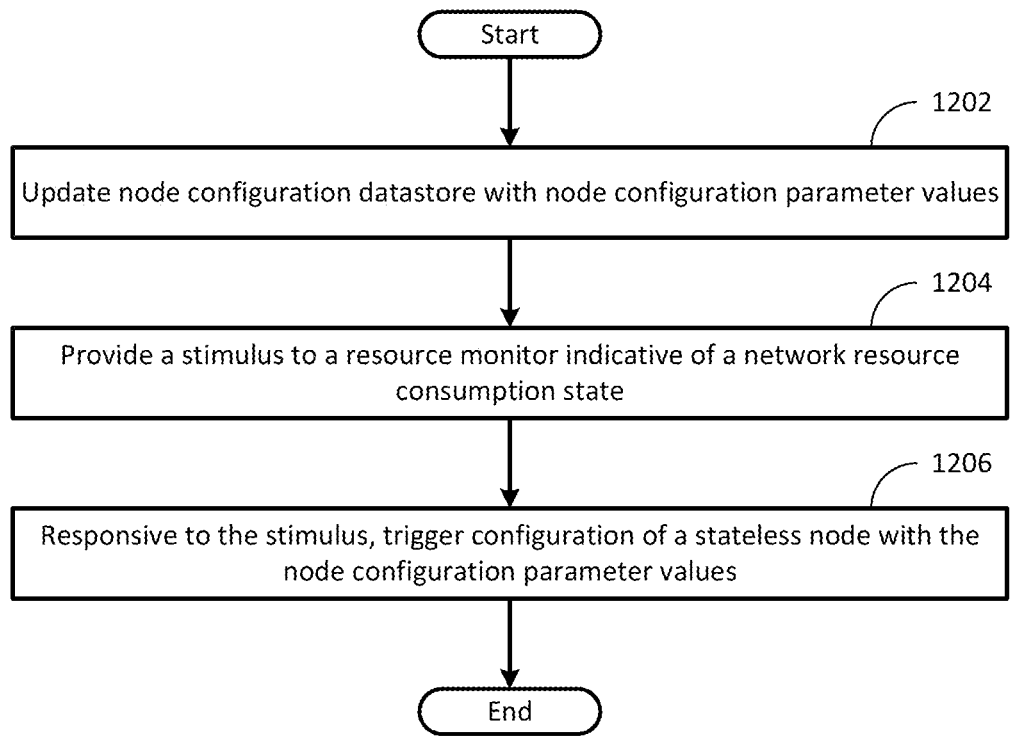
FIG. 12 is a flowchart of an example of a method for configuring a stateless node.

FIG. 12 is a flowchart 1200 of an example of a method for configuring a stateless node. The flowchart 1200 starts at module 1202 with updating a node configuration datastore with node configuration parameter values. The node configuration datastore may or may not include non-volatile storage. In a specific implementation, the node configuration parameter values include one or more of routing, IPsec, operating system, and forwarding parameter values. The module 1202 can be carried out by an orchestration engine, such as a multi-tenant orchestration engine (e.g., the multi-tenant orchestration engine 220 of FIG. 2 or the multi-tenant orchestration engine 420 of FIG. 4), an external orchestration engine (e.g., the external orchestration engine 902 of FIG. 9), or an external multi-tenant orchestration engine (combining the functionality of the multi-tenant orchestration engine 220 and the external orchestration engine 902).

The flowchart 1200 continues to module 1204 with providing a stimulus to a resource monitor indicative of a network resource consumption state. The stimulus can include an indication from a configured node, such as an S-node, B-node, or V-node, that network resource consumption is exceeding a network resource consumption threshold for the configured node. The network consumption threshold can be associated with network resource consumption that exceeds a value or that drops below a value. Alternatively, the indication can represent a level of network resource consumption at the configured node. In a specific implementation, the stimulus includes multiple values from a plurality of configured nodes that, considered in the aggregate, provide a snapshot or estimate of network resource consumption at the plurality of configured nodes. The stimulus can be pushed from a configured node to a resource monitor or pulled from a configured node to a resource monitor. The module 1204 can be carried out by a resource monitor, such as the resource monitor 916 of FIG. 9 (and the configured node 914 of FIG. 9).

The flowchart 1200 ends at module 1206 with, responsive to the stimulus, triggering configuration of a stateless node with the node configuration parameter values. The module 1206 can be carried out by an on-demand configuration engine, such as the on-demand configuration engine 918 of FIG. 9 (and the stateless node 920 of FIG. 9).

What is claimed is:

1. A system comprising:
one or more hardware processors; and
a memory storing instructions that, when executed by the one or more hardware processors, cause the system to perform:
  a configured node of a cloud exchange point (CXP) providing a stimulus to a resource monitor coupled to the configuration node, the stimulus indicative of a network resource consumption state;
  triggering, by an on-demand configuration engine responsive to the stimulus, the on-demand configuration engine to configure a stateless node with node configuration parameter values for routing, security, operating system, and forwarding.

2. The system of claim 1, wherein the instructions, when executed by the one or more hardware processors, cause the system to further perform
updating, by an external orchestration engine, the node configuration datastore with the node configuration parameter values.

3. The system of claim 2, comprising a tunnel state datastore coupled to the external orchestration engine.

4. The system of claim 2, comprising a tenant state datastore coupled to the external orchestration engine.

5. The system of claim 1, wherein the configured node includes a branch-facing node (B-node).

6. The system of claim 1, wherein the configured node includes a virtual private cloud (VPC) facing node (V-node).

7. The system of claim 1, wherein the configured node includes a service point attachment node (S-node).

8. The system of claim 7, comprising multiple services coupled to the S-node.

9. The system of claim 7, wherein the configured node is included in a cloud services network (CSN) that comprises:
a distributed service stitching (DSS) engine;
a monitoring engine;
a provisioning engine;
an analytics engine;
a data ingestion engine;
a policy engine;
a multi-tenant orchestration engine, which includes at least a portion of the orchestration engine.

10. The system of claim 7, comprising a regional service exchange point (RSXP), which includes a distributed service stitching (DSS) engine.

11. The system of claim 1, wherein the CXP is a first CXP, comprising a second CXP coupled to the first CXP, wherein the first CXP and the second CXP are, at least in part, part of a virtual extensible local area network (VXLAN).

12. The system of claim 1, comprising a virtual gateway (VGW) coupled to customer premises equipment (CPE) using a border gateway protocol (BGP).

13. A method comprising:
obtaining, from a configured node, a stimulus at a resource monitor indicative of a network resource consumption state; and
triggering, at an on-demand configuration engine responsive to the stimulus, the on-demand configuration engine to configure a stateless node with node configuration parameter values for routing, security, operating system, and forwarding.

14. The method of claim 13, wherein the configured node is an S-node, comprising providing multiple services associated with the S-node.

15. A system comprising:
means for obtaining, from a configured node, a stimulus at a resource monitor indicative of a network resource consumption state; and
means for triggering, at an on-demand configuration engine responsive to the stimulus, the on-demand configuration engine to configure a stateless node with node configuration parameter values for routing, security, operating system, and forwarding.

* * * * *